(12) United States Patent
Shao et al.

(10) Patent No.: US 12,271,963 B2
(45) Date of Patent: *Apr. 8, 2025

(54) METHOD FOR POWER CONSUMPTION ANALYSIS AND TROUBLESHOOTING OF PRODUCTION LINE BASED ON INDUSTRIAL INTERNET OF THINGS, SYSTEM AND STORAGE MEDIUM THEREOF

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Lei Zhang, Chengdu (CN); Bin Liu, Chengdu (CN); Yongzeng Liang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/487,112

(22) Filed: Oct. 15, 2023

(65) Prior Publication Data

US 2024/0037677 A1 Feb. 1, 2024

Related U.S. Application Data

(63) Continuation of application No. 18/172,274, filed on Feb. 21, 2023, now Pat. No. 11,830,091.

(30) Foreign Application Priority Data

Aug. 12, 2022 (CN) .......................... 202210965417.6

(51) Int. Cl.
*G06Q 50/06* (2024.01)
*G06N 5/022* (2023.01)
(Continued)

(52) U.S. Cl.
CPC ............. *G06Q 50/06* (2013.01); *G06N 5/022* (2013.01); *G06Q 10/06315* (2013.01); *G16Y 10/35* (2020.01); *G16Y 40/20* (2020.01)

(58) Field of Classification Search
CPC .......................................... G06Q 10/00–90/00
See application file for complete search history.

(56) References Cited

U.S. PATENT DOCUMENTS 10,575,072 B1 2/2020 Shao
2006/0149691 A1* 7/2006 Sindambiwe .......... G06Q 50/06
705/412

(Continued)

FOREIGN PATENT DOCUMENTS

CN 105574602 A 5/2016
CN 106602668 A 4/2017

(Continued)

OTHER PUBLICATIONS

"[Deep Learning] AutoEncoder (AutoEncoder)", Web page <https://zhuanlan.zhihu.com/p/133207206>, Jun. 23, 2021.

(Continued)

*Primary Examiner* — Arif Ullah
(74) *Attorney, Agent, or Firm* — METIS IP LLC

(57) ABSTRACT

The present disclosure provides a method for power consumption analysis and troubleshooting of a production line based on an Industrial Internet of Things, system, and storage medium thereof. The method comprises: resetting electric energy metering equipment based on an initialization instruction; in response to a successful reset of the electric energy metering equipment, completing a parameter configuration of the electric energy metering equipment based on a parameter configuration instruction; in response to a correct parameter configuration of the electric energy metering equipment, obtaining power consumption data, the power consumption data including historical internal power (Continued)

consumption data of the production line; determining an internal power consumption distribution of the production line through processing the historical internal power consumption data based on a distribution prediction model; and determining whether a power consumption of the production line is abnormal based on the internal power consumption distribution.

20 Claims, 6 Drawing Sheets

(51) Int. Cl.
  *G06Q 10/0631* (2023.01)
  *G16Y 10/35* (2020.01)
  *G16Y 40/20* (2020.01)

(56) References Cited

U.S. PATENT DOCUMENTS

2016/0020619 A1   1/2016   Ma et al.
2017/0006135 A1*  1/2017   Siebel ................. G06F 8/24

FOREIGN PATENT DOCUMENTS

CN    110806729 A    2/2020
CN    114815761 A    7/2022

OTHER PUBLICATIONS

"Understand the Attention mechanism in one article, everything you want to know is here", Web page <https://blog.csdn.net/xiewenbo/article/details/79382785>, Feb. 26, 2018.

Decision to grant a patent in Chinese Application No. 202210965417.6 mailed on Oct. 19, 2022, 9 pages.

S. G. Priyadharshini et al., An IOT Based Smart Metering Development for Energy Management System, International Journal of Electrical and Computer Engineering, 9(4): 3041~3050, 2019.

Shao, Zehua, Exploration and Research on the Structure of the Internet of Things, Internet of Things Technologies, 2015, 10 pages.

Peng, Yunqian et al., Flexible Interactive Intelligent Power Service Management Platform, Shaanxi Electric Power, 45(4): 34-38, 2017.

* cited by examiner

METHOD FOR POWER CONSUMPTION ANALYSIS AND TROUBLESHOOTING OF PRODUCTION LINE BASED ON INDUSTRIAL INTERNET OF THINGS, SYSTEM AND STORAGE MEDIUM THEREOF

CROSS-REFERENCE TO RELATED APPLICATIONS

The present application is a continuation of U.S. patent application Ser. No. 18/172,274, filed on Feb. 21, 2023, which claims priority to Chinese Patent Application No. 202210965417.6, filed on Aug. 12, 2022, the contents of which are hereby incorporated by reference to its entirety.

TECHNICAL FIELD

The present disclosure generally relates to intelligent manufacturing, and in particular to method for power consumption analysis and troubleshooting of a production line based on an Industrial Internet of Things, system, and storage medium thereof.

BACKGROUND

With a deep integration of the new generation of information technology and manufacturing industry, intelligent manufacturing based on information physical systems is leading a huge change in manufacturing methods. Intelligent manufacturing runs through all aspects of manufacturing activities such as design, production, management, and service. It is a new production mode with functions of self-perception, self-learning, self-decision-making, self-execution, and self-adaptation. Intelligent manufacturing can enhance an added value of industrial production and become a new growth point for social and economic development and scientific and technological innovation. With a development of intelligent manufacturing, energy conservation, and emission reduction are highly valued. As a basic resource for the development of intelligent manufacturing, the effective supervision of electricity has attracted more and more attention. The electricity supervision of existing intelligent manufacturing enterprises generally conducts real-time collection and integration of power consumption data by taking enterprises as a unit, plants as a unit, or workshops as a unit, which is not convenient for fine analysis of production line power consumption data and troubleshooting in case of abnormal power consumption. Sometimes, the cause of abnormal power consumption is not judged accurately enough, resulting in false alarm and delayed production process.

Therefore, it is hoped to provide a method for power consumption analysis and troubleshooting of a production line based on an Industrial Internet of Things, system, and storage medium, which can achieve more refined management of production line power consumption and reduce false alarm of power consumption abnormality.

SUMMARY

Some embodiments of the present disclosure provide a system for power consumption analysis and troubleshooting of a production line based on an Industrial Internet of Things. The system may comprise a non-transitory computer-readable storage medium storing computer instruction; and at least one processor in communication with the non-transitory computer-readable storage medium, when executing the computer instruction. The at least one processor may be directed to cause the system to: reset electric energy metering equipment based on an initialization instruction; in response to a successful reset of the electric energy metering equipment, complete a parameter configuration of the electric energy metering equipment based on a parameter configuration instruction; in response to a correct parameter configuration of the electric energy metering equipment, obtain power consumption data, the power consumption data including historical internal power consumption data of the production line; determine an internal power consumption distribution of the production line through processing the historical internal power consumption data based on a distribution prediction model, wherein the distribution prediction model is a machine learning model; and determine whether a power consumption of the production line is abnormal based on the internal power consumption distribution.

One of the embodiments of the present disclosure provides a method for power consumption analysis and troubleshooting of a production line based on an Industrial Internet of Things. The method may be realized based on a user platform, a service platform, a management platform, a sensor network platform, and at least one object platform that are interacted from top to bottom sequentially, the at least one object platform including electric energy metering equipment configured on each process of the production line, and the each process of the production line being configured with a piece of corresponding electric energy metering equipment. The method may comprise: resetting electric energy metering equipment based on an initialization instruction by the object platform, generating the initialization instruction by the service platform based on a user input of the user platform; in response to a successful reset of the electric energy metering equipment, completing a parameter configuration of the electric energy metering equipment based on a parameter configuration instruction sent by the service platform through the object platform; in response to a correct parameter configuration of the electric energy metering equipment, obtaining power consumption data uploaded by the object platform through the management platform, the power consumption data including historical internal power consumption data of the production line; determining an internal power consumption distribution of the production line through processing the historical internal power consumption data based on a distribution prediction model by the management platform, wherein the distribution prediction model is a machine learning model; and determining whether a power consumption of the production line is abnormal based on the internal power consumption distribution by the management platform.

One of the embodiments of the present disclosure provides a non-transitory computer-readable storage medium for storing computer instructions. When the computer reads the computer instructions in the storage medium, the computer executes the method for power consumption analysis and troubleshooting of a production line based on the Industrial Internet of Things.

BRIEF DESCRIPTION OF THE DRAWINGS

The present disclosure will be further described in the form of exemplary embodiments, which will be described in detail by the accompanying drawings. These embodiments are not restrictive. In these embodiments, the same number represents the same structure, wherein.

DETAILED DESCRIPTION

In order to more clearly explain the technical scheme of the embodiments of the present disclosure, the following will briefly introduce the drawings that need to be used in the description of the embodiments. Obviously, the drawings in the following description are only some examples or embodiments of the present disclosure. For those skilled in the art, the present disclosure can also be applied to other similar scenarios according to these drawings without creative work. Unless it is obvious from the language environment or otherwise stated, the same label in the FIG. represents the same structure or operation.

It should be understood that the "system", "device", "unit" and/or "module" used herein is a method for distinguishing different components, elements, parts or assemblies at different levels. However, if other words can achieve the same purpose, they can be replaced by other expressions.

As shown in the description and the claims, unless the context expressly indicates exceptions, the words "a", "an", "the", "one", and/or "this" do not specifically refer to the singular, but may also include the plural; and the plural forms may be intended to include the singular forms as well, unless the context clearly indicates otherwise. Generally speaking, the terms "include" only indicate that the steps and elements that have been clearly identified are included, and these steps and elements do not constitute an exclusive list. Methods or equipment may also include other steps or elements.

A flowchart is used in this disclosure to explain the operation performed by the system according to the embodiment of the present disclosure. It should be understood that the previous or subsequent operations are not necessarily performed accurately in order. Instead, the steps may be processed in reverse order or simultaneously. At the same time, you can add other operations to these processes, or remove one or more steps from these processes.

Figure 1:
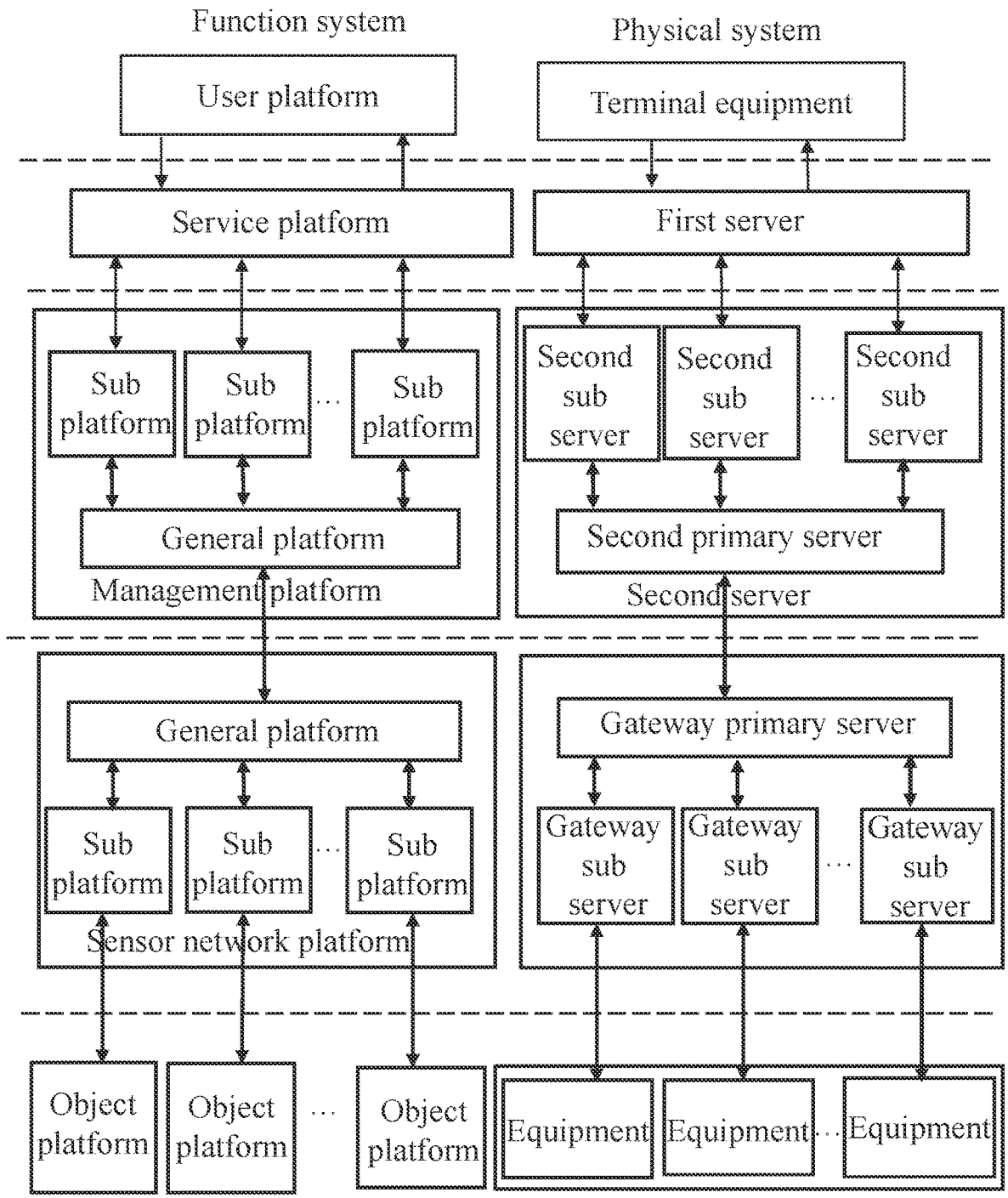
FIG. 1 is a structural framework diagram of a system for production line electricity management based on an Industrial Internet of Things according to some embodiments of the present disclosure.

FIG. 1 is a structural framework diagram of a system for production line electricity management based on an Industrial Internet of Things according to some embodiments of the present disclosure.

As shown in FIG. 1, the system for production line electricity management based on an Industrial Internet of Things may include a user platform, a service platform, a management platform, a sensor network platform and at least one object platform that are interacted from top to bottom sequentially. As used herein, the user platform, which may be configured as a terminal device to interact with users, may receive information input by the users and send the information to the service platform after processing, and display the information sent by the service platform to the users. The service platform, which may be configured as a first server, may receive the information sent by the user platform and send it to the management platform after processing, and obtain information required by the users from the management platform and send it to the user platform after processing. The management platform, which may be configured as a second server, may receive and store information sent by the service platform for controlling the object platform to perform parameter configuration, generate instructions to control the operation of the object platform, and receive and store the perception information sent by the object platform. The sensor network platform may be configured as a communication network and gateway for the management platform to interact with the object platform. The object platform, which may be configured as an electric energy metering equipment for measuring power consumption data, may receive parameter configuration information sent by the management platform to realize configuration, receive instructions from the management platform to run, and send sensing information to the management platform through the sensor network platform.

The object platform of this embodiment may be the electric energy metering equipment configured on each process of the production line, and each process of each production line may be configured with a piece of corresponding electric energy metering equipment. In a specific implementation of this embodiment, the user platform may be configured to generate the parameter configuration instruction of the electric energy metering equipment according to parameter configuration data of the electric energy metering equipment input by a user and send the parameter configuration instruction to the service platform. The user platform may be configured to receive and process a real-time power consumption curve of the process and display the real-time power consumption curve of the process to the user. As used herein, the parameter configuration data of the electric energy metering equipment input by the user may be data that the user adjust initial parameters of the electric energy metering equipment, and the parameter configuration instruction of the electric energy metering equipment may include the parameter configuration data of the electric energy metering equipment input by the user. The parameter configuration instruction of the electric energy metering equipment contains the parameter configuration data of the electric energy metering equipment input by the user. The service platform may be configured to receive the parameter configuration instruction of the electric energy metering equipment, generate the initialization instruction of the electric energy metering equipment after receiving the parameter configuration instruction of the electric energy metering equipment, and send the initialization instruction of the electric energy metering equipment to an object platform corresponding to the initialization instruction of the electric energy metering equipment through the management platform and the sensor network platform in turn. The service platform may be configured to receive the initial parameters of the electric energy metering equipment and compare initial parameters with actual parameters of the electric energy metering equipment after reset, and judge whether the electric energy metering equipment is reset successfully according to comparison results, in response to a judgement that the electric energy metering equipment is reset successfully, send the parameter configuration instruction of the electric energy metering equipment to an object platform corresponding to the parameter configuration instruction of the electric energy metering equipment through the management platform and the sensor network platform in turn, in response to a judgement that the electric energy metering equipment is not reset successfully, generate the initialization instruction of the electric energy metering equipment again and send the initialization instruction of the electric energy metering equipment to the object platform corresponding to the parameter configuration instruction of the electric energy metering equipment through the management platform and the sensor network platform in turn, and generate reset failure information and feed the reset failure information back to the user platform after completing the reset or when a count of reset failures reaches a set threshold value of reset failures. The service platform may be configured to receive actual parameters of the electric energy metering equipment after the parameter configuration, compare the parameter configuration data of the electric energy metering equipment input by the user with corresponding parameters in actual parameters of the electric energy metering equipment after the parameter configuration, and judge whether the electric energy metering equipment is correctly configured according to comparison results, in response to a judgement that the electric energy metering equipment is correctly configured, generate correct configuration information and feed the correct configuration information back to the user platform, and generate wrong configuration information and feed the wrong configuration information back to the user platform when the configuration is correct or a count of wrong configuration reaches a set threshold value of wrong configuration. The service platform may be configured to receive and process the real-time power consumption curve of the process and send the real-time power consumption curve to the user platform. The management platform may be configured to receive the power consumption data, generate the real-time power consumption curve from the measured power consumption data of the process by taking time as an abscissa and the measured power consumption data of each process as an ordinate, then store the real-time power consumption curve of the process and send the real-time power consumption curve of the process to the service platform. The sensor network platform may be configured to receive and process the power consumption data sent by the object platform and send the power consumption data to the management platform. The object platform may be configured to receive the initialization instruction of the electric energy metering equipment and complete the reset, then obtain the initial parameters of the electric energy metering equipment and the actual parameters after reset of the electric energy metering equipment, and send the initial parameters of the electric energy metering equipment and the actual parameters to the service platform through the sensor network platform and the management platform in turn. The object platform may be configured to receive and store the parameter configuration instruction of the electric energy metering equipment, complete the parameter configuration of the electric energy metering equipment according to the parameter configuration instruction of the electric energy metering equipment, then obtain the actual parameters after the parameter configuration, and send the actual parameters after the parameter configuration to the service platform through the sensor network platform and the management platform in turn. The object platform may be configured to measure the power consumption data of a corresponding process and send the power consumption data to the sensor network platform after processing. In the embodiment, the initialization instruction of the electric energy metering equipment may be a control instruction that controls an initialization operation of the electric energy metering equipment. The initial parameters of the electric energy metering equipment may be initial configuration parameters stored in the electric energy metering equipment.

Figure 2:
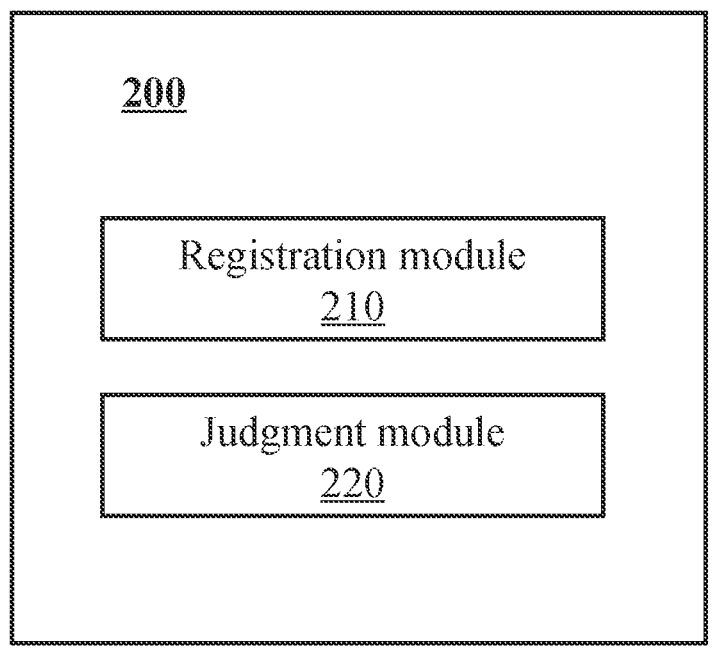
FIG. 2 is an exemplary module diagram of a system for production line electricity management based on an Industrial Internet of Things according to some embodiments of the present disclosure.

FIG. 2 is an exemplary module diagram of a system for production line electricity management based on an Industrial Internet of Things according to some embodiments of the present disclosure.

In some embodiments, the system for production line electricity management 200 may include a registration module 210 and a judgment module 220. The registration module 210 may be executed by the object platform and the judgment module may be executed by the management platform.

The registration module 210 may be configured to reset the electric energy metering equipment based on an initialization instruction. In response to a successful reset of the electric energy metering equipment, a parameter configuration of the electric energy metering equipment may be completed based on a parameter configuration instruction. For more information about resetting and parameter configuration of the electric energy metering equipment, please refer to FIG. 3, FIG. 4, and their related descriptions.

The judgment module 220 may be configured to in response to a correct parameter configuration of the electric energy metering equipment, obtain power consumption data, the power consumption data including historical internal power consumption data of a production line; obtain an internal power consumption distribution of the production line based on the power consumption data; and determine whether a power consumption of the production line is abnormal based on the internal power consumption distribution. For more information on obtaining the power consumption data and internal power consumption distribution, please refer to FIG. 3 and its related descriptions.

In some embodiments, in order to obtain the internal power consumption distribution of the production line, the judgment module 220 may be also configured to process historical internal power consumption data based on a distribution prediction model to determine the internal power consumption distribution of the production line. For more information about the distribution prediction model, please refer to FIG. 6 and its description.

In some embodiments, to determine whether the power consumption of the production line is abnormal based on the internal power consumption distribution, the judgment module 220 may be further configured to process the internal power consumption characteristics of the production line, the historical total power consumption of the production line and a current total power consumption of the production line based on the power consumption prediction model to determine predicted total power consumption of the production line at a current time; determine whether the power consumption of the production line is abnormal based on a difference between the current total power consumption and the predicted total power consumption of the production line. Please refer to FIG. 6 and its description for more information about the power consumption prediction model.

It should be understood that the system and modules of the system shown in FIG. 2 may be implemented in various ways. For example, in some embodiments, it may be implemented by hardware, software, or a combination of software and hardware.

It should be noted that the above description of the system for production line electricity management 200 and its modules is only for convenience of description and does not limit the present disclosure to the scope of the embodiments. It can be understood that for those skilled in the art, after understanding the principle of the system, they may arbitrarily combine various modules or form a subsystem to connect with other modules without departing from this principle. In some embodiments, the registration module and the judgment module disclosed in FIG. 2 may be different modules in a system, or a module may realize the functions of two or more of the above modules. For example, each module may share a storage module, and each module may also have its own storage module. Such deformation is within the protection scope of the present disclosure.

Figure 3:
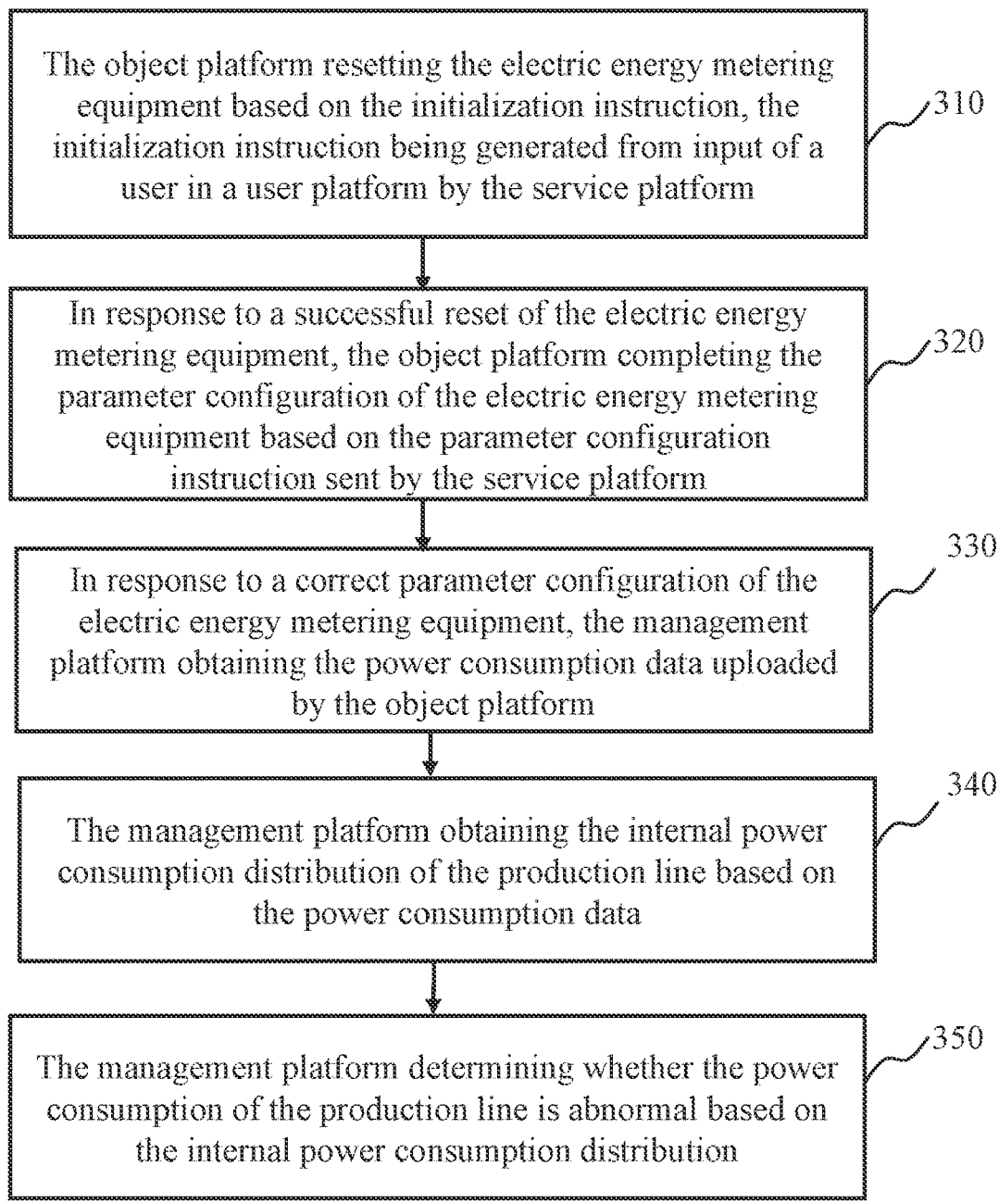
FIG. 3 is an exemplary flowchart of a method for production line electricity management based on an Industrial Internet of Things according to some embodiments of the present disclosure.

FIG. 3 is an exemplary flowchart of a method for production line electricity management based on an Industrial Internet of Things according to some embodiments of the present disclosure. In some embodiments, the process 300 may be executed by the system for production line electricity management 200. As shown in FIG. 3, the process 300 may include following steps.

In step 310, the object platform resets the electric energy metering equipment based on the initialization instruction.

The initialization instruction may be control information that may make the electric energy metering equipment enter an initial operation state. In some embodiments, the initialization instruction may include a plurality of initial parameters. The initial parameters may be used to make the electric energy metering equipment enter the initial operation state. For example, the initial parameters may include a connection mode of the electric energy metering equipment, the count of metering points, a configuration of metering transformers, a voltage of the electric energy metering equipment, etc.

The current parameters of the electric energy metering equipment may be reset as the initial parameters through initializing the electric energy metering equipment according to the initialization instruction. In some embodiments, the electric energy metering equipment that failed to be reset may be reset for a plurality of times. For more information about resetting the electric energy metering equipment and judging whether the reset is successful, please refer to FIG. 4 and its related descriptions.

In step 320, in response to a successful reset of the electric energy metering equipment, the object platform completes the parameter configuration of the electric energy metering equipment based on the parameter configuration instruction sent by the service platform.

In some embodiments, the service platform may compare the initial parameters with the actual parameters after the reset of the electric energy metering equipment, and judge whether the reset of the electric energy metering equipment is successful according to comparison results. For more information on determining whether the reset is successful, see FIG. 4 and its related descriptions.

The parameter configuration instruction may be a control parameter that controls the operation of the production line. For example, the parameter configuration instruction may be that a lower limit load of the measuring winding of the voltage transformer is 2.5 VA, and a rated load of the measuring protection winding is not greater than 50 VA. The parameter configuration instruction may be input by the user.

In step 330, in response to a correct parameter configuration of the electric energy metering equipment, the management platform obtains the power consumption data uploaded by the object platform.

In some embodiments, the service platform may compare parameter configuration data in the parameter configuration instruction with actual parameters of the electric energy metering equipment after configuration, and judge whether the electric energy metering equipment is configured correctly according to the comparison results. For example, after the configuration of the electric energy metering equipment is completed, an actual load power of a display electric energy transformer in a normal operation may reach 15% of a rated value, which is lower than at least 20% of a standard in the parameter configuration instruction, and then the wrong configuration information may be generated. For more information on determining whether the parameter configuration is correct, please refer to FIG. 4 and its related descriptions.

The power consumption data may refer to data related to a power consumption of each production line. For example, the power consumption data may include 50 kWh of power consumption of production line A in a last month, or a real-time power consumption curve of process A. In some embodiments, the power consumption data may include historical internal power consumption data of a production line. The historical internal power consumption data may reflect historical data of power consumption of each process of a production line, such as respective power consumption of different processes and different types of electrical equipment. Please refer to FIG. 6 and the related descriptions for more descriptions of the historical internal power consumption data.

In some embodiments, the object platform may measure the power consumption data of a corresponding process and send the power consumption data to the sensor network platform after processing. The sensor network platform may receive and process the power consumption data sent by the object platform, and send the processed power consumption data to the management platform.

In step 340, the management platform obtains the internal power consumption distribution of the production line based on the power consumption data.

The internal power consumption distribution may refer to proportions of power consumption of each process in the production line. For example, the power consumption of process A may account for 20% of power consumption of a total production line.

In some embodiments, the management platform may analyze the historical power consumption data inside the production line to obtain the internal power consumption distribution of each production line, or summarize and process current power consumption data, and obtain the internal power consumption distribution of each production line through statistical analysis (such as drawing a histogram or pie chart).

In some embodiments, the management platform may process the historical internal power consumption data based on the distribution prediction model to determine the internal power consumption distribution of the production line. For more information about the distribution prediction model, see FIG. 6 and its related descriptions.

In step 350, the management platform determines whether the power consumption of the production line is abnormal based on the internal power consumption distribution.

Abnormal power consumption may refer to an abnormal power consumption caused by a failure of the electric energy metering equipment. The failure of the electric energy metering equipment may cause abnormal fluctuations in the power consumption. For example, if the power consumption of production line A has significantly increased in a last hour compared with a previous hour, it is indicated that there may be abnormal power consumption of production line A. It is worth noting that there are sensors in the electric energy metering equipment, and there may be abnormal power consumption caused by sensor interference. For example, if the sensor is subject to short-time electromagnetic interference, such abnormal power consumption caused by external interference factors belong to false anomaly and needs to be eliminated. In some embodiments, the false anomaly may be excluded by a duration of the abnormal power consumption. For example, if the duration of the abnormal power consumption is lower than a preset threshold, it may be determined that the abnormal power consumption is false. The preset threshold may be determined based on the duration of historical false anomaly.

In some embodiments, the management platform may compare the historical power consumption of each process with a current power consumption to determine whether the power consumption of the process is abnormal. For example, the power consumption of each process from 13:00 to 14:00 on a same day may be compared with the power consumption of the same period last week, and a process corresponding to the power consumption exceeding a fluctuation threshold may be considered as abnormal power consumption. The fluctuation threshold may be set manually, for example, the fluctuation threshold may not exceed ±5%. In some embodiments, fluctuation thresholds may be set manually for each process according to the power consumption of each process, and when a real-time power consumption of a single process exceeds a threshold corresponding to the process, an anomaly may be prompted. The threshold may be related to an equipment type and operation parameters of the equipment corresponding to the process. For example, the threshold may be set higher for high-power equipment. In some embodiments, the threshold may be manually set for a sum of real-time power consumption of each process in the production line according to the power consumption of the production line. When the sum of real-time power consumption of the production line exceeds the threshold, an anomaly may be prompted.

In some embodiments, the management platform may determine whether the power consumption of the production line is abnormal based on the internal power consumption distribution. Specifically, the management platform may process the internal power consumption characteristics of the production line, the historical power consumption data of the production line, and the current power consumption data of the production line based on the power consumption prediction model to determine the predicted power consumption data of the production line at a current time; and determine whether the power consumption of the production line is abnormal based on the difference between the current power consumption data and the predicted power consumption data of the production line. For more information about the power consumption prediction model, see FIG. 6 and its related descriptions.

In some embodiments of the present disclosure, by controlling the parameter configuration of the electric energy metering equipment, it may ensure that the electric energy metering equipment is in normal operation. By measuring and processing the power consumption data of each process in real time, users may know power consumption conditions of each process in a timely manner. In this way, the power consumption of a production line may be monitored, so that a power consumption in a unit of enterprise, plant, or workshop may be refined to a power consumption in a unit of the production line, so as to facilitate the analysis of the power consumption data of each process of a production line, and further facilitate troubleshooting when the power consumption of the production line is abnormal.

It should be noted that the above description of process 300 is only for example and description, and does not limit the scope of application of the present disclosure. For those skilled in the art, various modifications and changes can be made to process 300 under a guidance of the present disclosure. However, these amendments and changes are still within the scope of the present disclosure.

Figure 4:
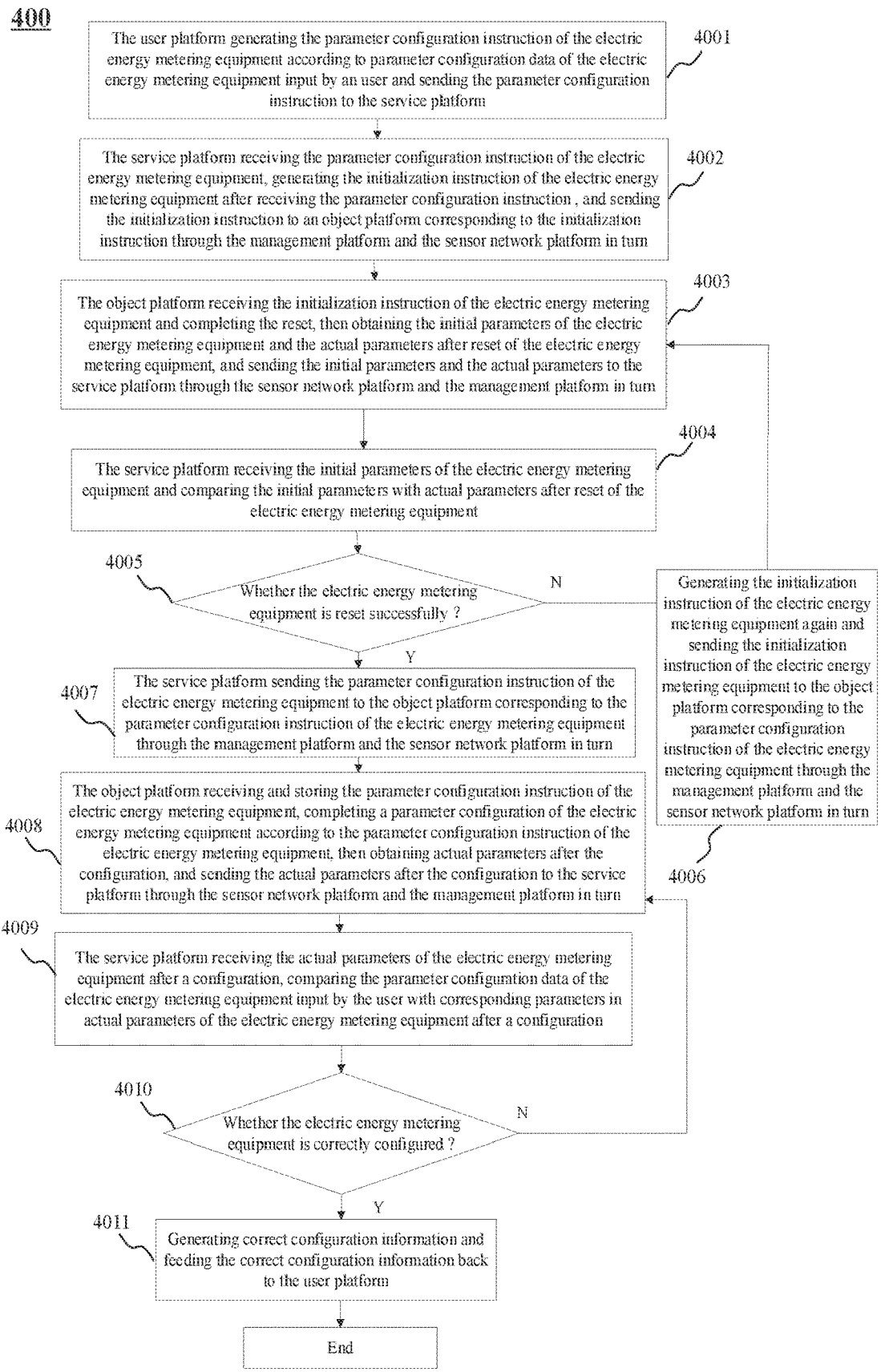
FIG. 4 is an exemplary flowchart of a parameter configuration of electric energy metering equipment according to some embodiments of the present disclosure.

FIG. 4 is an exemplary flowchart of a parameter configuration of electric energy metering equipment according to some embodiments of the present disclosure.

In some embodiments, the parameter configuration process of the electric energy metering equipment may be shown in FIG. 4, including following steps: in step 4001, the user platform generating the parameter configuration instruction of the electric energy metering equipment according to parameter configuration data of the electric energy metering equipment input by a user and sending the parameter configuration instruction to the service platform; the parameter configuration data of the electric energy metering equipment input by the user being data that the user adjusts initial parameters of the electric energy metering equipment, and the parameter configuration instruction of the electric energy metering equipment including the parameter configuration data of the electric energy metering equipment input by the user; in step 4002, the service platform receiving the parameter configuration instruction of the electric energy metering equipment, generating the initialization instruction of the electric energy metering equipment after receiving the parameter configuration instruction of the electric energy metering equipment, and sending the initialization instruction of the electric energy metering equipment to an object platform corresponding to the initialization instruction of the electric energy metering equipment through the management platform and the sensor network platform in turn; in step 4003, the object platform receiving the initialization instruction of the electric energy metering equipment and completing the reset, then obtaining the initial parameters of the electric energy metering equipment and the actual parameters after reset of the electric energy metering equipment, and sending the initial parameters of the electric energy metering equipment and the actual parameters to the service platform through the sensor network platform and the management platform in turn; in step 4004, the service platform receiving the initial parameters of the electric energy metering equipment and comparing the initial parameters with actual parameters after reset of the electric energy metering equipment; in step 4005, the service platform judging whether the electric energy metering equipment is reset successfully according to comparison results, in response to a judgement that the electric energy metering equipment is reset successfully, going to step 4007, in response to a judgement that the electric energy metering equipment is not reset successfully, going to step 4006, generating the initialization instruction of the electric energy metering equipment again and sending the initialization instruction of the electric energy metering equipment to the object platform corresponding to the initialization instruction of the electric energy metering equipment through the management platform and the sensor network platform in turn, then going to step 4003 and generating reset failure information and feeding the reset failure information back to the user platform after completing the parameter reset or when a count of reset failures reaches a set threshold value of reset failures; in step 4007, the service platform sending the parameter configuration instruction of the electric energy metering equipment to the object platform corresponding to the parameter configuration instruction of the electric energy metering equipment through the management platform and the sensor network platform in turn; in step 4008, the object platform receiving and storing the parameter configuration instruction of the electric energy metering equipment, completing a parameter configuration of the electric energy metering equipment according to the parameter configuration instruction of the electric energy metering equipment, then obtaining actual parameters after the configuration, and sending the actual parameters after the configuration to the service platform through the sensor network platform and the management platform in turn; in step 4009, the service platform receiving the actual parameters of the electric energy metering equipment after a configuration, comparing the parameter configuration data of the electric energy metering equipment input by the user with corresponding parameters in actual parameters of the electric energy metering equipment after a configuration, then going to step 4010 to judge whether the electric energy metering equipment is correctly configured according to comparison results, in response to a judgement that the electric energy metering equipment is correctly configured, going to step 4011 to generate correct configuration information and feed the correct configuration information back to the user platform, in response to a judgement that the electric energy metering equipment is not correctly configured, going to step 4008 to generate wrong configuration information and feed the wrong configuration information back to the user platform when the configuration is correct or a count of wrong configuration reaches a set threshold value of wrong configuration. In the application of this embodiment, the parameter configuration of the electric energy metering equipment may be configured before an initial use of the system, and the parameter configuration may be not required during the use of the system.

Figure 5:
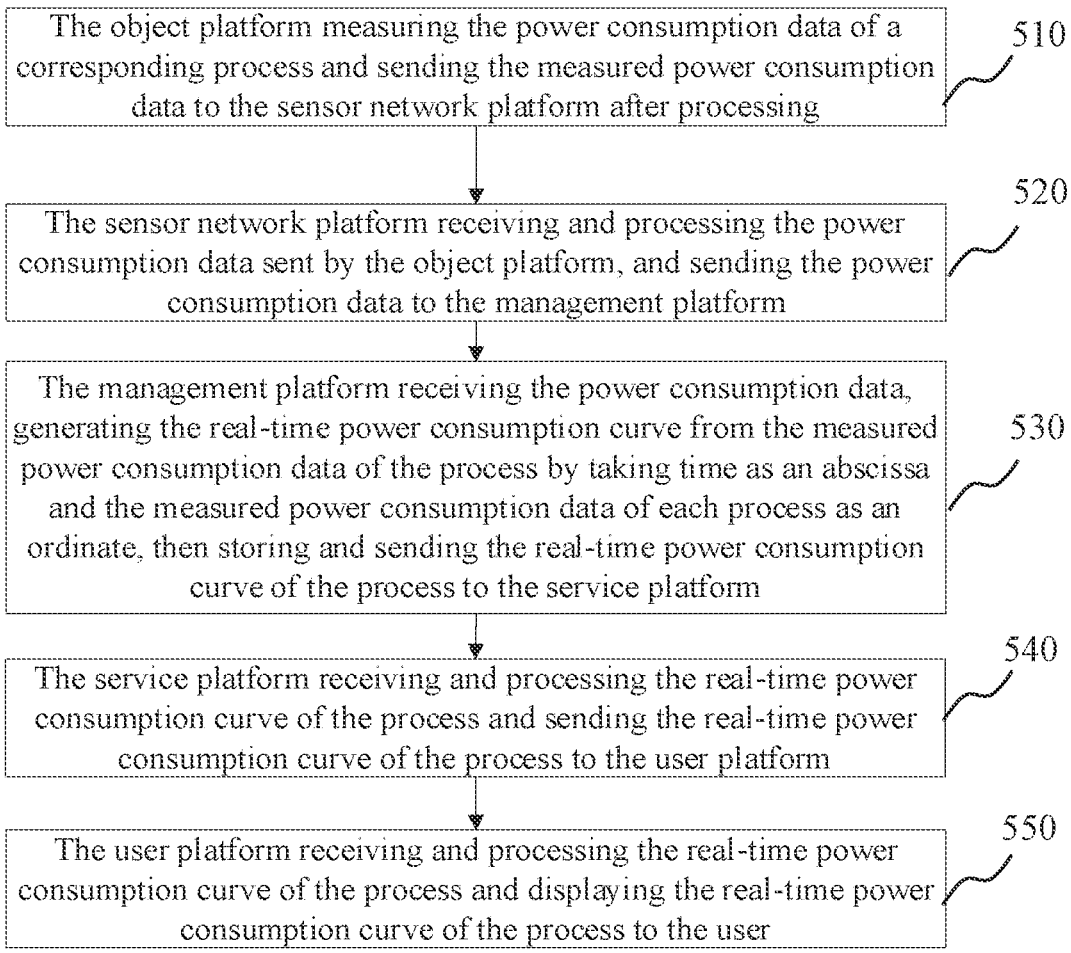
FIG. 5 is an exemplary flowchart of processing of electric energy metering data according to some embodiments of the present disclosure.

FIG. 5 is an exemplary flowchart processing electric energy metering data according to some embodiments of the present disclosure.

In some embodiments, the processing process of the electric energy metering may be shown in FIG. 5, including following steps: in step 510, the object platform measuring the power consumption data of a corresponding process and sending the measured power consumption data to the sensor network platform after processing; in step 520, the sensor network platform receiving and processing the power consumption data sent by the object platform, and sending the power consumption data to the management platform; in step 530, the management platform receiving the power consumption data, generating the real-time power consumption curve from the measured power consumption data of the process by taking time as an abscissa and the measured power consumption data of each process as an ordinate, then storing and sending the real-time power consumption curve of the process to the service platform; in step 540, the service platform receiving and processing the real-time power consumption curve of the process and sending the real-time power consumption curve of the process to the user platform; in step 550, the user platform receiving and processing the real-time power consumption curve of the process and displaying the real-time power consumption curve of the process to the user.

Figure 6:
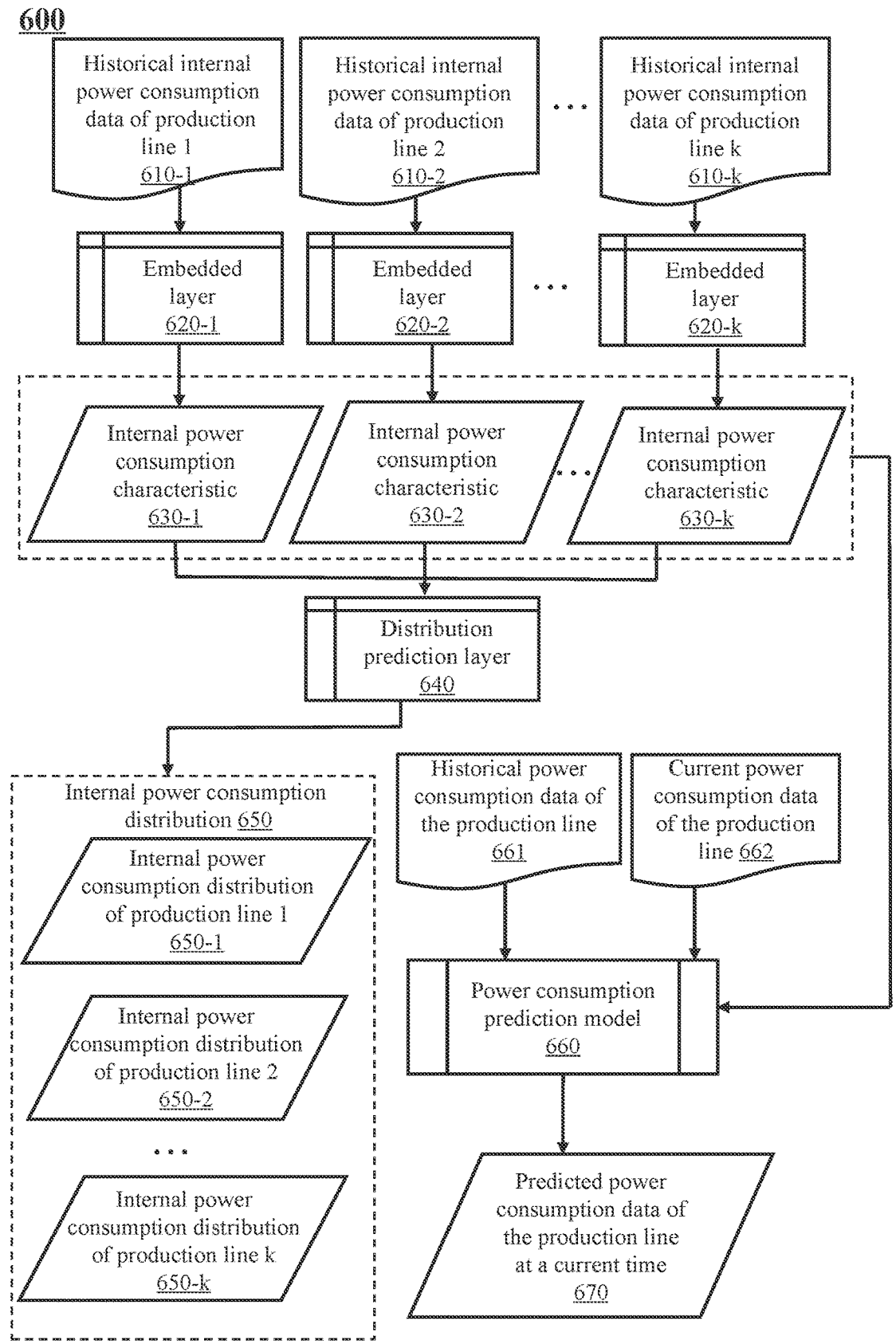
FIG. 6 is an exemplary schematic diagram for determining an internal power consumption distribution of the production line and determining predicted power consumption data according to some embodiments of the present disclosure.

FIG. 6 is an exemplary schematic diagram for determining an internal power consumption distribution of the production line and determining predicted power consumption data according to some embodiments of the present disclosure.

In some embodiments, the management platform may process the historical internal power consumption data based on the distribution prediction model to determine the internal power consumption distribution of the production line.

The historical internal power consumption data may reflect historical power consumption data of each process of the production line. For example, the historical internal power consumption data may include power consumptions of different types of electrical equipment in different processes at historical times. The historical internal power consumption data may be represented by vectors, and vector elements may include the power consumption of each process or each electrical equipment in the process. For example, if there are three processes on production line 1, the three processes are cutting process, processing process and assembly process. As used herein, the cutting process may include a thermal cutting machine and a mechanical cutting machine, the processing process may include processing equipment, and the assembly process may include assembly equipment. If the power consumption of the above equipment at a historical time t1 is 2000 kW·h, 1000 kW·h, 1500 kW·h and 800 kW·h respectively, a vector ((2000, 1000), 1500, 800) may be used to represent the historical internal power consumption data of production line 1. In some embodiments, the historical internal power consumption data may include the internal power consumption data of the production line at a plurality of historical times, for example, the historical internal power consumption data may include the power consumption data of each process in the production line 1, production line 2, . . . , production line k and/or each electrical equipment in a process at historical times t1, t2, . . . , tn. As used herein, the historical internal power consumption data at each historical time may be represented by a vector, and each vector may include the power consumption data of each process and/or the power consumption data of each electrical equipment in the process at a current historical time.

The internal power consumption distribution of the production line may reflect distributions of power consumption in each process of the production line. The internal power consumption distribution may be expressed by vectors, and the vector elements may include the power consumption of each process or each equipment in the process and a proportion of the power consumption to the total power consumption. For example, at a current time, for the production line 1, the power consumption of the cutting process is 300 kW·h, the power consumption of the processing process is 1000 kW·h, and the power consumption of the assembly process is 200 kW·h, a corresponding internal power consumption distribution may be expressed as ((300, 20%), (1000, 66.7%), (200, 13.3%)).

The distribution prediction model may be configured to process historical internal power consumption data of a production line and determine an internal power consumption distribution of a production line at a current time. In some embodiments, the distribution prediction model may be a machine learning model.

In some embodiments, the distribution prediction model may include a plurality of embedded layers and a distribution prediction layer.

Each of the plurality of embedded layers may be configured to process the historical internal power consumption data of a production line to determine internal power consumption characteristics of a corresponding production line. As shown in FIG. 6, the embedded layer 620-1 may process historical internal power consumption data 610-1 of production line 1 to determine corresponding internal power consumption characteristics 630-1, the embedded layer 620-2 may process historical internal power consumption data 610-2 of production line 2 to determine corresponding internal power consumption characteristics 630-2, . . . , and the embedded layer 620-k may process historical internal power consumption data 610-k of production line k to determine corresponding internal power consumption characteristics 630-k. A processing process of the embedded layer may be essentially a process of extracting depth information (such as the power consumption of different types of electrical equipment in different processes) from the historical internal power consumption data of each production line.

The distribution prediction layer may be configured to process the internal power consumption characteristics of the plurality of production lines to determine the internal power consumption distribution of each production line. As shown in FIG. 6, the distribution prediction layer 640 may process an internal power consumption characteristics 630-1 of production line 1, an internal power consumption characteristics 630-2 of production line 2, . . . , an internal power consumption characteristics 630-k of production line k to determine an internal power consumption distribution 650 of each production line including an internal power consumption distribution 650-1 of production line 1, an internal power consumption distribution 650-2 of production line 2, . . . , and an internal power consumption distribution 650-k of production line k. In some embodiments, the distribution prediction layer may be a machine learning model, such as a neural network model.

In some embodiments, the plurality of embedded layers and distribution prediction layers may be jointly trained. The plurality of embedded layers may have same initial parameters, and the parameters may be shared. When the parameters are updated iteratively in training, the parameters of a plurality of embedded models may be updated synchronously.

In some embodiments, training samples for joint training may include sample history internal power consumption data of a sample production line, and labels of the training samples may be an internal power consumption distribution at a current time, and the labels may be obtained by manual annotation. The historical internal power consumption data of each production line in the training samples may be input into the corresponding embedded layer of each production line to obtain the corresponding internal power consumption characteristics of each production line. The labels and the internal power consumption characteristics output by each embedded layer may be input into the distribution prediction layer to determine prediction results of each production line (i.e., the internal power consumption distribution). A loss function may be constructed based on the prediction results and labels. Parameters of the plurality of embedded layers and distribution prediction layers may be updated synchronously based on the loss function, and a trained distribution prediction model may be obtained through parameter updating.

In some embodiments of the present disclosure, the machine learning model may be configured to obtain the internal power consumption characteristics of each production line based on the historical power consumption data of each production line, and predict the internal power consumption distribution of the production line at a current time. The internal power consumption characteristics and internal power consumption distribution may be further used for detecting abnormal power consumption.

In some embodiments, the management platform may determine whether the power consumption of the production line is abnormal based on the internal power consumption distribution of the production line. Specifically, the management platform may process the internal power consumption characteristics of the production line, the historical power consumption data of the production line, and the current power consumption data of the production line based on the power consumption prediction model to determine the predicted power consumption data of the production line at the current time, and determine whether the power consumption of the production line is abnormal based on a difference between the current power consumption data and the predicted power consumption data corresponding to the process of the production line.

The historical power consumption data of the production line may include corresponding power consumption of each process on the production line at a plurality of historical times, which may be represented by a vector. Each element of the vector may represent the power consumption of each process on the production line at a certain historical time. For example, the historical power consumption data of production line A at historical times t1, t2, . . . , tn−1 may be represented by a vector $\vec{x}_{t_1}, \vec{x}_{t_2}, \ldots, \vec{x}_{t_{n-1}}$, where $\vec{x}_{t_1}=(x_{11}, x_{12}, \ldots, x_{1N})$, N is a total count of the process, $x_{11}$ represents the power consumption of process 1 in production line A at time t1, $x_{12}$ represents the power consumption of process 2 in production line A at time t1, and so on. In some embodiments, t1, t2, . . . , tn−1 may be n−1 consecutive historical times.

In some embodiments, the plurality of historical times corresponding to the historical power consumption data may be different from the historical times corresponding to the historical internal power consumption data input into the embedded layer, for example, the historical times corresponding to the historical power consumption data 661 of the production line and the historical times corresponding to the historical internal power consumption data 610-1 of the production line 1 may be different.

The current power consumption data of the production line may include the corresponding power consumption of each process on the production line at a current time, which may be expressed by a vector. For example, current power consumption data of production line A at the current time tn may be represented using a vector $\vec{x}_{t_n}$, where $\vec{x}_{t_n}=(x_{n1}, x_{n2}, \ldots, x_{nN})$, N is a total count of the processes, $x_{n1}$ represents the power consumption of process 1 in production line A at the current time, $x_{n2}$ represents the power consumption of process 2 in production line A at tn time, and so on. In some embodiments, the current power consumption data of the production line may be obtained based on electricity meter data of each process of the production line at the current time.

The predicted power consumption data of the production line at the current time may be a predicted value of the power consumption data of the production line at the current time based on the historical power consumption data and current power consumption data of the production line, which may include the predicted power consumption corresponding to each process of the production line at the current time. Similar to the current power consumption data of the production line, the predicted power consumption data may be represented by the vector, which will not be repeated here.

As shown in FIG. 6, the input of the power consumption prediction model 660 may include the internal power consumption characteristics of all production lines (such as the internal power consumption characteristics 630-1, 630-2, ..., 630-$k$), the historical power consumption data 661 of the production line, and the current power consumption data 662 of the production line, and the output of the power consumption prediction model 660 may be the predicted power consumption data 670 of the corresponding production line at the current time. In some embodiments, the power consumption prediction model may be a machine learning model, such as an Autoencoder model including an encoder and a decoder. The encoder and decoder may include a Long Short Memory Network (LSTM). In some embodiments, the internal power consumption characteristics of all production lines may be input into the encoder as an end vector to obtain an encoded value, the encoded value may be input into the decoder to obtain the predicted power consumption data of the production line at the current time.

In some embodiments, the power consumption prediction model may be trained through training samples and labels. The training samples may include the internal power consumption characteristics of all production lines and the historical power consumption data of the sample production lines. Different samples may correspond to the historical power consumption data of different production lines. The labels of the power consumption prediction model may be the current power consumption data of the corresponding production line at the current time. The labels may be obtained through manual labeling. For example, the training samples and labels may be input into the power consumption prediction model, and the prediction results may be determined to be the predicted power consumption data of each process of the production line at the current time. The loss function may be established based on the prediction results and labels, and the parameters of the power consumption prediction model may be updated based on the loss function until preset conditions are satisfied. As used herein, the preset conditions may be that the loss function converges, a count of iterations reaches a threshold value, etc.

In some embodiments, the management platform may determine whether the power consumption of the production line is abnormal based on the difference between the current power consumption data of a production line and the power consumption of the corresponding process of the predicted power consumption data. For example, when the difference between the current power consumption data of a production line and the power consumption of the corresponding process of the predicted power consumption data is greater than a threshold value, the abnormal power consumption of the production line may be determined.

In some embodiments, different processes of the production line may correspond to different thresholds, and the threshold may be related to the internal power consumption distribution of the process. For example, if the power consumption distribution of a plurality of electrical equipment in a certain process of the production line is uneven, it may be that there are many types of electrical equipment in the process, and a tolerance of prediction errors in the process may be higher, so the threshold corresponding to the process may be set higher.

In some embodiments of the present disclosure, the machine learning model may be configured to predict the power consumption of each process of the production line, and whether the power consumption is abnormal may be determined based on differences between a prediction result and the power consumption of each process at the current time. At the same time, the threshold may be set according to actual situation of different processes, which may make detection results of the abnormal power consumption more accurate and reduce an occurrence of false alarm.

The basic concepts have been described above. Obviously, for those skilled in the art, the above detailed disclosure is only an example and does not constitute a limitation of the present disclosure. Although it is not explicitly stated here, those skilled in the art may make various modifications, improvements, and amendments to the present disclosure. Such modifications, improvements and amendments are suggested in the present disclosure, so such modifications, improvements and amendments still belong to the spirit and scope of the exemplary embodiments of the present disclosure.

Meanwhile, the present disclosure uses specific words to describe the embodiments of the present disclosure. For example, "one embodiment", and/or "some embodiments" mean a certain feature or structure related to at least one embodiment of the present disclosure. Therefore, it should be emphasized and noted that "one embodiment" or "an alternative embodiment" mentioned twice or more in different positions in the present disclosure does not necessarily refer to the same embodiment. In addition, certain features or structures in one or more embodiments of the present disclosure may be appropriately combined.

In addition, unless explicitly stated in the claims, the sequence of processing elements and sequences, the use of numbers and letters, or the use of other names described in the present disclosure are not used to define the sequence of processes and methods in the present disclosure. Although the above disclosure has discussed some currently considered useful embodiments of the invention through various examples, it should be understood that such details are only for the purpose of explanation, and the additional claims are not limited to the disclosed embodiments. On the contrary, the claims are intended to cover all amendments and equivalent combinations that conform to the essence and scope of the embodiments of the present disclosure. For example, although the system components described above can be implemented by hardware devices, they can also be implemented only by software solutions, such as installing the described system on an existing server or mobile device.

Similarly, it should be noted that, in order to simplify the description disclosed in the present disclosure and thus help the understanding of one or more embodiments of the invention, the foregoing description of the embodiments of the present disclosure sometimes incorporates a variety of features into one embodiment, the drawings or the description thereof. However, this disclosure method does not mean that the object of the present disclosure requires more features than those mentioned in the claims. In fact, the features of the embodiments are less than all the features of the single embodiments disclosed above.

In some embodiments, numbers describing the number of components and attributes are used. It should be understood that such numbers used in the description of embodiments are modified by the modifier "about", "approximate" or "generally" in some examples. Unless otherwise stated, "approximately" or "generally" indicate that a ±20% change in the FIG. is allowed. Accordingly, in some embodiments, the numerical parameters used in the description and claims are approximate values, and the approximate values can be changed according to the characteristics required by individual embodiments. In some embodiments, the numerical parameter should consider the specified significant digits and adopt the method of general digit reservation. Although the numerical fields and parameters used to confirm the range breadth in some embodiments of the present disclosure are approximate values, in specific embodiments, the setting of such values is as accurate as possible within the feasible range.

For each patent, patent application, patent application disclosure and other materials cited in the present disclosure, such as articles, books, specifications, publications, documents, etc., the entire contents are hereby incorporated into the present disclosure for reference. Except for the application history documents that are inconsistent with or conflict with the contents of the present disclosure, and the documents that limit the widest range of claims in the present disclosure (currently or later appended to the present disclosure). It should be noted that in case of any inconsistency or conflict between the description, definitions, and/or use of terms in the supplementary materials of the present disclosure and the contents described in the present disclosure, the description, definitions, and/or use of terms in the present disclosure shall prevail.

Finally, it should be understood that the embodiments described in the present disclosure are only used to illustrate the principles of the embodiments of the present disclosure. Other deformations may also fall within the scope of the present disclosure. Therefore, as an example rather than a limitation, the alternative configuration of the embodiments of the present disclosure can be regarded as consistent with the teachings of the present disclosure. Accordingly, the embodiments of the present disclosure are not limited to those explicitly introduced and described in the present disclosure.

What is claimed is:

1. A system for power consumption analysis and troubleshooting of a production line based on an Industrial Internet of Things, comprising:
   a non-transitory computer-readable storage medium storing computer instruction; and
   at least one processor in communication with the non-transitory computer-readable storage medium, when executing the computer instruction, the at least one processor is directed to cause the system to:
   reset electric energy metering equipment based on an initialization instruction;
   in response to a successful reset of the electric energy metering equipment, complete a parameter configuration of the electric energy metering equipment based on a parameter configuration instruction;
   in response to a correct parameter configuration of the electric energy metering equipment, obtain power consumption data, the power consumption data including historical internal power consumption data of the production line;
   determine an internal power consumption distribution of the production line through processing the historical internal power consumption data based on a distribution prediction model, wherein the distribution prediction model is a machine learning model; and
   determine whether a power consumption of the production line is abnormal based on the internal power consumption distribution.

2. The system for power consumption analysis and troubleshooting of the production line based on the Industrial Internet of Things of claim 1, wherein the distribution prediction model includes a plurality of embedded layers and a distribution prediction layer;
   each of the plurality of embedded layers is configured to process the historical internal power consumption data of one production line to determine internal power consumption characteristics of the production line; and
   the distribution prediction layer is configured to process the internal power consumption characteristics of a plurality of production lines to determine the internal power consumption distribution of each production line.

3. The system for power consumption analysis and troubleshooting of the production line based on the Industrial Internet of Things of claim 2, wherein the distribution prediction model is obtained by jointly training the plurality of embedded layers and the distribution prediction layer, training samples include sample history internal power consumption data of a sample production line, and labels are internal power consumption distribution at a time corresponding to the training samples.

4. The system for power consumption analysis and troubleshooting of the production line based on the Industrial Internet of Things of claim 2, wherein to determine whether the power consumption of the production line is abnormal based on the internal power consumption distribution, the at least one processor is further directed to cause the system to:
   determine predicted power consumption data of the production line at a current time through processing the internal power consumption characteristics of the production line, historical power consumption data of the production line, and current power consumption data of the production line based on a power consumption prediction model; and
   determine whether the power consumption of the production line is abnormal based on a difference between the current power consumption data and the predicted power consumption data.

5. The system for power consumption analysis and troubleshooting of the production line based on the Industrial Internet of Things of claim 4, wherein the power consumption prediction model includes an Autoencoder model, wherein the Autoencoder model includes an encoder and a decoder, and the at least one processor is further directed to cause the system to:
   input the internal power consumption characteristics of the production line as an end vector into the encoder to obtain an encoded value, and
   input the encoded value into the decoder to obtain the predicted power consumption data at the current time.

6. The system for power consumption analysis and troubleshooting of the production line based on the Industrial Internet of Things of claim 1, wherein the Industrial Internet of Things including a user platform, a service platform, a management platform, a sensor network platform, and at least one object platform that are interacted from top to bottom sequentially, the user platform including a terminal device, the service platform including a first server, the management platform including a second server, the sensor network platform including a communication network and a gateway, the object platform including the electric energy metering equipment configured on each process of the production line, and the each process of the production line being configured with a piece of corresponding electric energy metering equipment, wherein the at least one processor is further directed to cause the system to execute processing of the electric energy metering data, wherein the object platform is configured to measure the power consumption data of a corresponding process and send the measured power consumption data to the sensor network platform after processing;

the sensor network platform is configured to receive and process the power consumption data sent by the object platform, and send the power consumption data to the management platform;

the management platform is configured to receive the power consumption data, generate a real-time power consumption curve of the each process of the production line using a measured time as an abscissa and the measured power consumption data of the each process of the production line as an ordinate, then store real-time power consumption curve of the each process of the production line and send the real-time power consumption curve of the each process of the production line to the service platform;

the service platform is configured to receive and process the real-time power consumption curve of the each process of the production line and send the real-time power consumption curve of the each process of the production line to the user platform; and the user platform is configured to receive and process the real-time power consumption curve of the each process of the production line and display the real-time power consumption curve of the each process of the production line to the user.

7. The system for power consumption analysis and troubleshooting of the production line based on the Industrial Internet of Things of claim 6, wherein before executing the processing of the electric energy metering data, the at least one processor is further directed to cause the system to execute parameter configuration steps of the electric energy metering equipment, wherein the user platform is configured to generate the parameter configuration instruction of the electric energy metering equipment according to parameter configuration data of the electric energy metering equipment input by the user and send the parameter configuration instruction to the service platform, wherein the parameter configuration data of the electric energy metering equipment input by the user is data that the user adjusts initial parameters of the electric energy metering equipment, and the parameter configuration instruction of the electric energy metering equipment includes the parameter configuration data of the electric energy metering equipment input by the user;

the service platform is configured to receive the parameter configuration instruction of the electric energy metering equipment, generate the initialization instruction of the electric energy metering equipment after receiving the parameter configuration instruction of the electric energy metering equipment, and send the initialization instruction of the electric energy metering equipment to an object platform corresponding to the initialization instruction of the electric energy metering equipment through the management platform and the sensor network platform in turn;

the service platform is configured to receive the initial parameters of the electric energy metering equipment and compare the initial parameters with actual parameters after reset of the electric energy metering equipment, and judge whether the electric energy metering equipment is reset successfully according to comparison results, in response to a judgement that the electric energy metering equipment is reset successfully, send the parameter configuration instruction of the electric energy metering equipment to an object platform corresponding to the parameter configuration instruction of the electric energy metering equipment through the management platform and the sensor network platform in turn, in response to a judgement that the electric energy metering equipment is not reset successfully, generate the initialization instruction of the electric energy metering equipment again and send the initialization instruction of the electric energy metering equipment to the object platform corresponding to the parameter configuration instruction of the electric energy metering equipment through the management platform and the sensor network platform in turn, and generate reset failure information and feed the reset failure information back to the user platform after completing a reset or when a count of reset failures reaches a set threshold value of reset failures;

the object platform is configured to receive the initialization instruction of the electric energy metering equipment and complete a reset, then obtain the initial parameters of the electric energy metering equipment and the actual parameters after the reset of the electric energy metering equipment, and send the initial parameters of the electric energy metering equipment and the actual parameters to the service platform through the sensor network platform and the management platform in turn;

the object platform is configured to receive and store the parameter configuration instruction of the electric energy metering equipment, complete the parameter configuration of the electric energy metering equipment according to the parameter configuration instruction of the electric energy metering equipment, then obtain the actual parameters after the parameter configuration, and send the actual parameters after the parameter configuration to the service platform through the sensor network platform and the management platform in turn.

8. The system for power consumption analysis and troubleshooting of the production line based on the Industrial Internet of Things of claim 7, wherein the service platform is further configured to:

receive actual parameters of the electric energy metering equipment after the parameter configuration, compare the parameter configuration data of the electric energy metering equipment input by the user with corresponding parameters in actual parameters of the electric energy metering equipment after the parameter configuration, and judge whether the electric energy metering equipment is correctly configured according to comparison results, in response to a judgement that the electric energy metering equipment is correctly configured, generate correct configuration information and feed the correct configuration information back to the user platform, and generate wrong configuration information and feed the wrong configuration information back to the user platform when the configuration is correct or a count of wrong configuration reaches a set threshold value of wrong configuration.

9. The system for power consumption analysis and troubleshooting of the production line based on the Industrial Internet of Things of claim 8, wherein the service platform adopts a centralized layout, and the centralized layout means that the service platform receives data, processes data, and sends data uniformly; the management platform adopts a rear sub platform layout, the rear sub platform layout means that the management platform is provided with a general platform and a plurality of sub platforms, control information and parameter configuration information of the object platform are transmitted from the sub platforms of the management platform to the general platform of the management platform, and sensing information is transmitted from the general platform of the management platform to the sub platforms of the management platform; the sensor network platform adopts a front sub platform layout, the front sub platform layout means that the sensor network platform is provided with a general platform and a plurality of sub platforms, the control information and the parameter configuration information of the object platform are transmitted from the general platform of the sensor network platform to the sub platforms of the sensor network platform, and the sensing information is transmitted from the sub platforms of the sensor network platform to the general platform of the sensor network platform;

the parameter configuration instruction of the electric energy metering equipment and the initialization instruction of the electric energy metering equipment are the control information, the parameter configuration instruction of the electric energy metering equipment and the initialization instruction of the electric energy metering equipment are transmitted from sub platforms of the management platform to the general platform of the management platform during a transmission of the management platform, each sub platform of the management platform transmits the parameter configuration instruction of the electric energy metering equipment and the initialization instruction of the electric energy metering equipment corresponding to an object platform; the parameter configuration instruction of the electric energy metering equipment and the initialization instruction of the electric energy metering equipment are transmitted from the general platform of the sensor network platform to sub platforms of the sensor network platform during a transmission of the sensor network platform, and each sub platform of the sensor network platform transmits the parameter configuration instruction of the electric energy metering equipment and the initialization instruction of the electric energy metering equipment corresponding to an object platform; and the power consumption data measured by the object platform is the sensing information, and the power consumption data measured by the each process is transmitted from sub platforms of the sensor network platform to the general platform of the sensor network platform during the transmission of the sensor network platform, the sub platform of the sensor network platform transmitting the power consumption data correspondingly transmits the power consumption data measured by a process; the power consumption data measured in the each process is transmitted from the general platform of the management platform to the sub platforms of the management platform during the transmission of the management platform, the sub platform of the management platform generates the real-time power consumption curve of the each process of the production line, and the sub platform of the management platform generating the real-time power consumption curve of the each process of the production line processes the power consumption data measured by the process correspondingly.

10. The system for power consumption analysis and troubleshooting of the production line based on the Industrial Internet of Things of claim 6, wherein the management platform is further configured to send the received power consumption data to the service platform;

the service platform is further configured to receive the power consumption data, sum up the power consumption data measured at a same time for all processes of a same production line, and generate the real-time power consumption curve of the each process of the production line from a sum of the power consumption data of each production line by taking time of the each process as an abscissa and the measured power consumption data of the each process as an ordinate, then store the real-time power consumption curve of the each process of the production line and send the real-time power consumption curve of the each process of the production line to the user platform; and the user platform is further configured to receive and process the real-time power consumption curve of the each process of the production line and display the real-time power consumption curve of the each process of the production line to the user.

11. The system for power consumption analysis and troubleshooting of the production line based on the Industrial Internet of Things of claim 10, wherein the object platform is configured to send the measured power consumption data to the sensor network platform at a set time interval, and all object platforms are configured to synchronously send the measured power consumption data;

the service platform is further configured to calculate a difference between total values of power consumption data of two adjacent summations of each production line, and compare the difference with a set threshold value of power consumption differences of the corresponding production line, when the calculated difference is greater than or equal to the set threshold value of power consumption difference of the corresponding production line, the service platform is further configured to generate abnormal power consumption alarm information of the production line and send the abnormal power consumption alarm information of the production line to the user platform; and the user platform is further configured to receive and process the abnormal power consumption alarm information of the production line and display the abnormal power consumption alarm information of the production line to the user.

12. The system for power consumption analysis and troubleshooting of the production line based on the Industrial Internet of Things of claim 11, wherein when the service platform generates the abnormal power consumption alarm information of the production line, the service platform is further configured to send the abnormal power consumption alarm information of the production line to the management platform;

the management platform is further configured to calculate a difference of the measured power consumption data of two adjacent of each process of the production line, and compare the difference with a set threshold value of power consumption difference of a corresponding process, when the difference is greater than or equal to the set threshold value of power consumption differences of the corresponding process, the management platform is further configured to generate the abnormal power consumption alarm information of the process and send the abnormal power consumption alarm information of the process to the service platform;

the service platform is further configured to receive the abnormal power consumption alarm information of the process and send the abnormal power consumption alarm information of the process to the user platform; and the user platform is further configured to receive and process the abnormal power consumption alarm information of the process and display the abnormal power consumption alarm information of the process to the user.

13. A method for power consumption analysis and troubleshooting of a production line based on an Industrial Internet of Things, the method being realized based on a user platform, a service platform, a management platform, a sensor network platform, and at least one object platform that are interacted from top to bottom sequentially, the user platform including a terminal device, the service platform including a first server, the management platform including a second server, the sensor network platform including a communication network and a gateway, the at least one object platform including electric energy metering equipment configured on each process of the production line, and the each process of the production line being configured with a piece of corresponding electric energy metering equipment, wherein the method comprises:

resetting electric energy metering equipment based on an initialization instruction by the object platform, generating the initialization instruction by the service platform based on a user input of the user platform;

in response to a successful reset of the electric energy metering equipment, completing a parameter configuration of the electric energy metering equipment based on a parameter configuration instruction sent by the service platform through the object platform;

in response to a correct parameter configuration of the electric energy metering equipment, obtaining power consumption data uploaded by the object platform through the management platform, the power consumption data including historical internal power consumption data of the production line;

determining an internal power consumption distribution of the production line through processing the historical internal power consumption data based on a distribution prediction model by the management platform, wherein the distribution prediction model is a machine learning model; and determining whether a power consumption of the production line is abnormal based on the internal power consumption distribution by the management platform.

14. The method for power consumption analysis and troubleshooting of the production line based on an Industrial Internet of Things of claim 13, wherein the distribution prediction model includes a plurality of embedded layers and a distribution prediction layer;

each of the plurality of embedded layers is configured to process the historical internal power consumption data of one production line to determine internal power consumption characteristics of the production line; and the distribution prediction layer is configured to process the internal power consumption characteristics of a plurality of production lines to determine the internal power consumption distribution of each production line.

15. The method for power consumption analysis and troubleshooting of the production line based on an Industrial Internet of Things of claim 14, wherein the distribution prediction model is obtained by jointly training the plurality of embedded layers and the distribution prediction layer, training samples include sample history internal power consumption data of a sample production line, and labels are internal power consumption distribution at a time corresponding to the training samples.

16. The method for power consumption analysis and troubleshooting of the production line based on an Industrial Internet of Things of claim 13, wherein the determining whether a power consumption of the production line is abnormal based on the internal power consumption distribution includes:

determining predicted power consumption data of the production line at a current time through processing the internal power consumption characteristics of the production line, historical power consumption data of the production line, and current power consumption data of the production line based on a power consumption prediction model; and determining whether the power consumption of the production line is abnormal based on a difference between the current power consumption data and the predicted power consumption data.

17. The method for power consumption analysis and troubleshooting of the production line based on an Industrial Internet of Things of claim 16, wherein the power consumption prediction model includes an Autoencoder model, wherein the Autoencoder model includes an encoder and a decoder, and the determining whether a power consumption of the production line is abnormal based on the internal power consumption distribution includes:

inputting the internal power consumption characteristics of the production line as an end vector into the encoder to obtain an encoded value, and inputting the encoded value into the decoder to obtain the predicted power consumption data at the current time.

18. The method for power consumption analysis and troubleshooting of the production line based on the Industrial Internet of Things of claim 13, the method including processing steps of the electric energy metering data, wherein the processing steps of electric energy metering data include:

measuring, by the object platform, the power consumption data of a corresponding process and sending the measured power consumption data to the sensor network platform after processing;

receiving and processing, by the sensor network platform, the power consumption data sent by the object platform, and sending the power consumption data to the management platform;

receiving, by the management platform, the power consumption data, generating a real-time power consumption curve of the each process of the production line using a measured time as an abscissa and the measured power consumption data of the each process of the production line as an ordinate, then storing real-time power consumption curve of the each process of the production line and sending the real-time power consumption curve of the each process of the production line to the service platform;

receiving and processing, by the service platform, the real-time power consumption curve of the each process of the production line and sending the real-time power consumption curve of the each process of the production line to the user platform; and receiving and processing, by the user platform, the real-time power consumption curve of the each process of the production line and displaying the real-time power consumption curve of the each process of the production line to the user.

19. The method for power consumption analysis and troubleshooting of the production line based on the Industrial Internet of Things of claim 18, wherein before executing the processing steps of the electric energy metering data, the method further includes parameter configuration steps of the electric energy metering equipment, including:

generating, by the user platform, the parameter configuration instruction of the electric energy metering equipment according to parameter configuration data of the electric energy metering equipment input by the user and send the parameter configuration instruction to the service platform, wherein the parameter configuration data of the electric energy metering equipment input by the user is data that the user adjusts initial parameters of the electric energy metering equipment, and the parameter configuration instruction of the electric energy metering equipment includes the parameter configuration data of the electric energy metering equipment input by the user;

receiving, by the service platform, the parameter configuration instruction of the electric energy metering equipment, generating the initialization instruction of the electric energy metering equipment after receiving the parameter configuration instruction of the electric energy metering equipment, and sending the initialization instruction of the electric energy metering equipment to an object platform corresponding to the initialization instruction of the electric energy metering equipment through the management platform and the sensor network platform in turn;

receiving, by the object platform, the initialization instruction of the electric energy metering equipment and completing a reset, then obtaining the initial parameters of the electric energy metering equipment and the actual parameters after the reset of the electric energy metering equipment, and sending the initial parameters of the electric energy metering equipment and the actual parameters to the service platform through the sensor network platform and the management platform in turn;

receiving, by the service platform, the initial parameters of the electric energy metering equipment and comparing the initial parameters with actual parameters after reset of the electric energy metering equipment, and judging whether the electric energy metering equipment is reset successfully according to comparison results, in response to a judgement that the electric energy metering equipment is reset successfully, sending the parameter configuration instruction of the electric energy metering equipment to an object platform corresponding to the parameter configuration instruction of the electric energy metering equipment through the management platform and the sensor network platform in turn, in response to a judgement that the electric energy metering equipment is not reset successfully, generating the initialization instruction of the electric energy metering equipment again and sending the initialization instruction of the electric energy metering equipment to the object platform corresponding to the parameter configuration instruction of the electric energy metering equipment through the management platform and the sensor network platform in turn, and generating reset failure information and feeding the reset failure information back to the user platform after completing the reset or when a count of reset failures reaches a set threshold value of reset failures;

receiving and storing, by the object platform, the parameter configuration instruction of the electric energy metering equipment, completing the parameter configuration of the electric energy metering equipment according to the parameter configuration instruction of the electric energy metering equipment, then obtaining the actual parameters after the parameter configuration, and sending the actual parameters after the parameter configuration to the service platform through the sensor network platform and the management platform in turn.

20. A non-transitory computer-readable storage medium for storing computer instructions, wherein when the computer reads the computer instructions in the storage medium, the computer runs the method for power consumption analysis and troubleshooting of the production line based on the Industrial Internet of Things of claim 13.

* * * * *